United States Patent [19]

Tanaka

[11] Patent Number: 5,698,051

[45] Date of Patent: Dec. 16, 1997

US005698051A

[54] PNEUMATIC TIRES WITH SPECIFIED STIFFENER DIMENSIONS

[75] Inventor: Yoshinori Tanaka, Tokyo, Japan

[73] Assignee: Bridgestone Corporation, Tokyo, Japan

[21] Appl. No.: 623,988

[22] Filed: Mar. 29, 1996

[30] Foreign Application Priority Data

Apr. 21, 1995 [JP] Japan ................................. 7-097013

[51] Int. Cl.$^6$ ................ B60C 9/18; B60C 9/20; B60C 15/06

[52] U.S. Cl. ............. 152/531; 152/534; 152/536; 152/541; 152/546; 152/547

[58] Field of Search ................... 152/541, 546, 152/547, 539, 531, 534–536

[56] References Cited

U.S. PATENT DOCUMENTS

| | | |
|---|---|---|
| 3,973,612 | 8/1976 | Mezzanotte . |
| 5,526,863 | 6/1996 | Hodges ........................... 152/541 |

FOREIGN PATENT DOCUMENTS

| | | |
|---|---|---|
| 0 738 618 A1 | 10/1996 | European Pat. Off. . |
| 2238600 | 2/1975 | France . |
| 4163212 | 6/1992 | Japan . |

OTHER PUBLICATIONS

Patent Abstracts of Japan, vol. 012, No. 201 (M–707), Jun. 10, 1988 & JP-A-63 008006 (Yokohama Rubber Co. Ltd.:The), Jan. 13 1988.

Patent Abstracts of Japan, vol. 95, No. 001 & JP-A-07 017212 (Sumitomo Rubber Ind Ltd), Jan 20, 1995.

Patent Abstracts of Japan, vol. 95, No. 004 & JP-A-07 108806 (Sumitomo Rubber Ind Ltd), Apr. 25, 1995.

English version of Abstract for JP-A-4-163212.

*Primary Examiner*—Adrienne C. Johnstone
*Attorney, Agent, or Firm*—Sughrue, Mion, Zinn, Macpeak & Seas, PLLC

[57] ABSTRACT

A pneumatic radial tire comprises a pair of bead cores, a carcass extending toroidally between the bead cores, a stiffener disposed one on each of bead cores and a belt comprising rubberized cord plies and disposed on a crown portion of the carcass, wherein the rubberized cord plies comprise a first rubberized ply having steel cords inclined with respect to the tire equatorial plane and at least one second rubberized ply having organic fiber cords extending substantially in parallel with the tire equatorial plane, the relation between the height H of the stiffener in the radial direction and the section height SH of the tire is given by 0.4 SH≦H≦0.6 SH, and the average thickness d of the upper portion of the stiffener defined between a height corresponding to 0.35 SH and the top of the stiffener is given by 0.5 mm≦d≦0.2 D where D is the thickness of the stiffener at the bottom portion adjacent to the bead core.

11 Claims, 4 Drawing Sheets

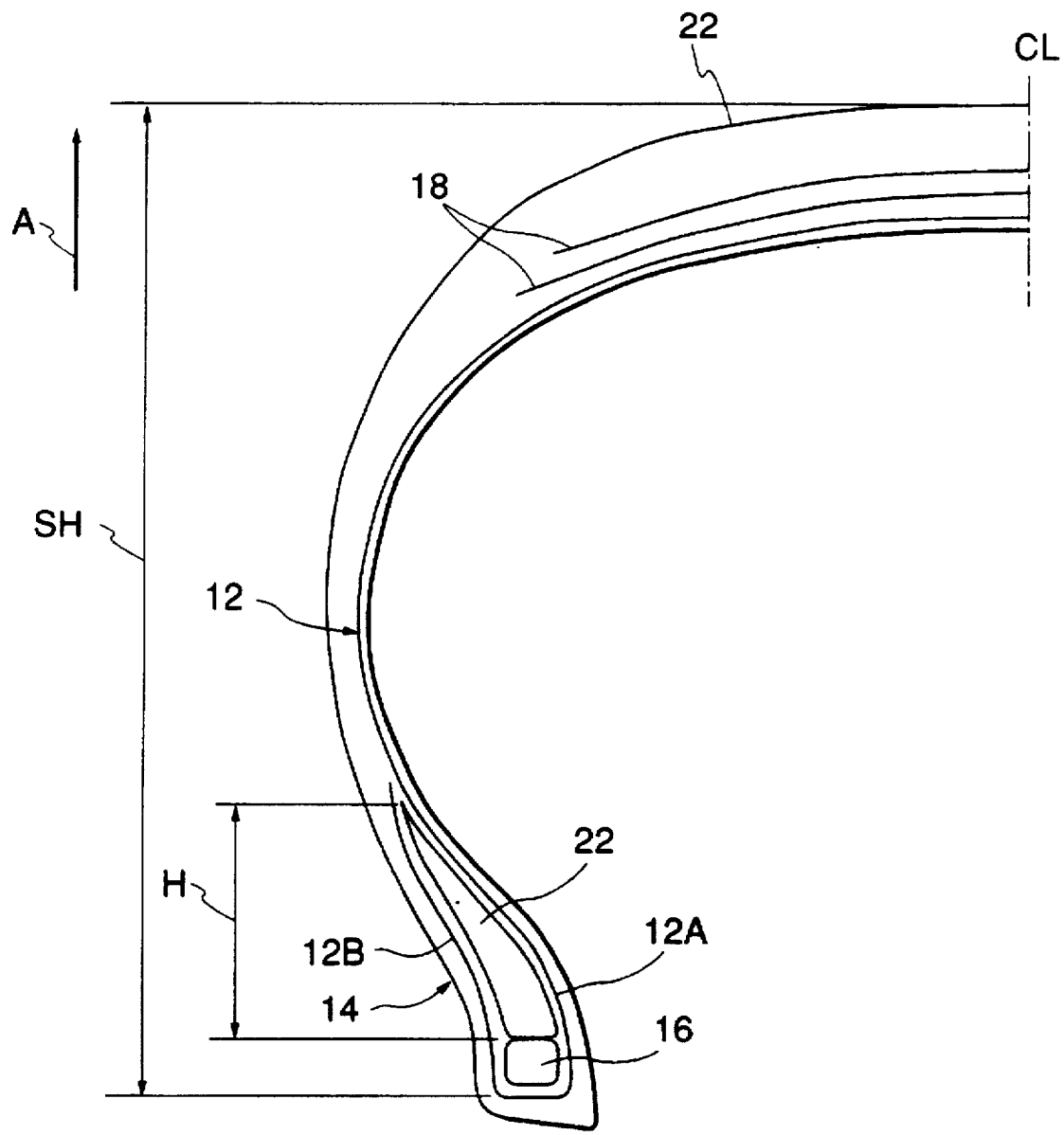
Fig.4
CONVENTIONAL

PNEUMATIC TIRES WITH SPECIFIED STIFFENER DIMENSIONS

BACKGROUND OF THE INVENTION

1. Field of the Invention

This invention relates to pneumatic tires, and in particular to a pneumatic radial tire having reduced weight.

2. Description of the Prior Art

A conventional pneumatic radial tire for general use has two steel belt layers with cords in one of the layers crossing those in the other layer. However, this tire is relatively heavy because of the two steel belt layers.

There has been proposed a tire for the purpose of reducing its weight, which has one belt layer of inclined steel cords and one belt layer of circumferential organic fiber cords, instead of two steel belt layers (see, for example, U.S. Pat. No. 3,973,612).

However, since this tire does not have two steel belt layers with crossing cords, the flexural rigidity of the belt is lowered because the rigidity of the organic fiber cord is much smaller than that of the steel cord, and the steering stability is apt to be degraded.

It is an object of the present invention to provide a pneumatic radial tire having reduced weight while retaining the steering stability.

In order to retain the steering stability and to take advantage of the merit of lightening the tire by combining an inclined belt ply of steel cords and a circumferential belt ply of organic fiber cords, the present inventor has carried out various experiments and analyzed the relation between the steering stability and the rigidity of the tire. As a result, it has been found that not only the lateral rigidity of the tire but also the torsion rigidity of the tire in the tire rolling direction considerably affect the steering stability. Futhermore, the inventor has made studies based on the assumption that it is possible to compensate for the loss in steering stability caused by lowered flexural rigidity due to lightening of the tire if torsion rigidity can be increased without increasing the weight of the tire. As a result it has been found that it is possible to overcome or at least mitigate the above mentioned problem by optimizing the cross-sectional shape of the stiffener.

SUMMARY OF THE INVENTION

The present invention provides a pneumatic radial tire comprising a pair of bead cores, a carcass extending toroidally between the bead cores, a stiffener disposed one on each bead core, and a belt comprising rubberized cord plies and disposed on a crown portion of the carcass, wherein the rubberized cord plies comprise a first rubberized ply having steel cords inclined with respect to the tire equatorial plane and at least one second rubberized ply having organic fiber cords extending substantially in parallel with the tire equatorial plane, and wherein the relation between the height H of the stiffener in the radial direction and the section height SH of the tire is given by $0.4\ SH \leq H \leq 0.6\ SH$, and the average thickness d of the upper portion of the stiffener defined between a height corresponding to 0.35 SH and the top of the stiffener is given by $0.5\ mm \leq d \leq 0.2\ D$ where D is the thickness of the stiffener at the bottom portion adjacent to the bead core.

Further, it is preferable that the relation between the average thickness d of each region of the stiffener and the thickness D is given by $0.6\ D \leq d \leq D$ in a first region, $0.2\ D \leq d \leq 0.6\ D$ in a second region, and $0.5\ mm \leq d \leq 0.2\ D$ in a third region when the stiffener is equally divided into a first region, a second region and a third region in turn in the radially outward direction.

In the pneumatic radial tire according to the invention, the belt comprises a first rubberized ply having steel cords inclined with respect to the equatorial plane of the tire and at least one second rubberized ply having organic fiber cords extending substantially in parallel with the equatorial plane and the belt reinforces the crown portion of the carcass. Since organic fiber cord is lighter than steel cord, the weight of the tire is reduced. It is preferable for increasing in-plane shearing rigidity that the cord angle of the first rubberized ply is 25°–45° with respect to the equatorial plane.

Further, since the relation between the height H of the stiffener in the radial direction and the section height SH of the tire is given by $0.4\ SH \leq H \leq 0.6\ SH$ and the average thickness d of the upper portion of the stiffener defined between the height of 0.35 SH and the top of the stiffener is given by $0.5\ mm \leq d \leq 0.2\ D$ where D is the thickness of the stiffener at the bottom portion adjacent to the bead core, it is possible that torsion rigidity of the tire in the tire rolling direction is increased without increasing the weight of the tire in comparison with a tire using a conventional stiffener. Also, the loss of the steering stability by decreasing of the belt flexural rigidity due to the weight reduction of the tire is compensated for by the increased torsion rigidity, and the riding comfort is not degraded.

If $H<0.4\ SH$, the required effect of increasing the torsion rigidity cannot be obtained. If $H>0.6\ SH$, in the tire side portion where distortion is large, separation failure (separation) is apt to occur at the top of the stiffener due to the difference in rigidity between stiffener and side rubber, and riding comfort is degraded due to excessive rigidity in the radial direction of the tire.

The average thickness d of the upper portion of the stiffener, which is defined as the portion above the height of 0.35 SH, is important for the steering stability and riding comfort. If $d<0.5\ mm$, the required torsion rigidity is not obtained, and if $d>0.2\ D$, riding comfort is degraded.

The whole shape of the stiffener is defined by the average thickness d of the three regions whereby the total weight of the stiffener is not increased while enhancing the above mentioned property of the tire.

The average thickness d is preferably defined such that $0.6\ D \leq d \leq D$ in the first region, because the flexural rigidity is lowered and as a result the lateral rigidity of the tire is much lowered if the average thickness d is made too small.

The average thickness d is preferably defined such that $0.2\ D \leq d \leq D$ in the second region, because the average thickness d of the second region does not affect the lateral rigidity so much as in the first region and thereby it is possible to lighten the tire by making the thickness small.

Furthermore, the average thickness d is preferably defined such that $0.5\ mm \leq d \leq 0.2\ D$ in the third region, because the influence of the third region on the lateral rigidity is smallest and the influence of the third region on the torsion rigidity is largest, and thereby it is possible to increase the torsion rigidity without degrading the lateral rigidity when the thickness is made thinner than the thickness in the second region to reduce the weight of the tire.

It is preferable that the Shore-A hardness of the stiffener is not less than 90°.

Further the stiffener can have a multi-layer structure comprising different rubber materials such as hard rubber stiffener and soft rubber stiffener as well as a single layer structure consisting of a single rubber material.

BRIEF DESCRIPTION OF THE DRAWINGS

FIG. 4 is a cross-section along the axis of a pneumatic radial tire according to a conventional embodiment.

DESCRIPTION OF THE PREFERRED EMBODIMENTS

Embodiments of pneumatic radial tires according to this invention will be explained with reference to FIG. 1 and FIG. 2 of the drawings.

Figure 1:
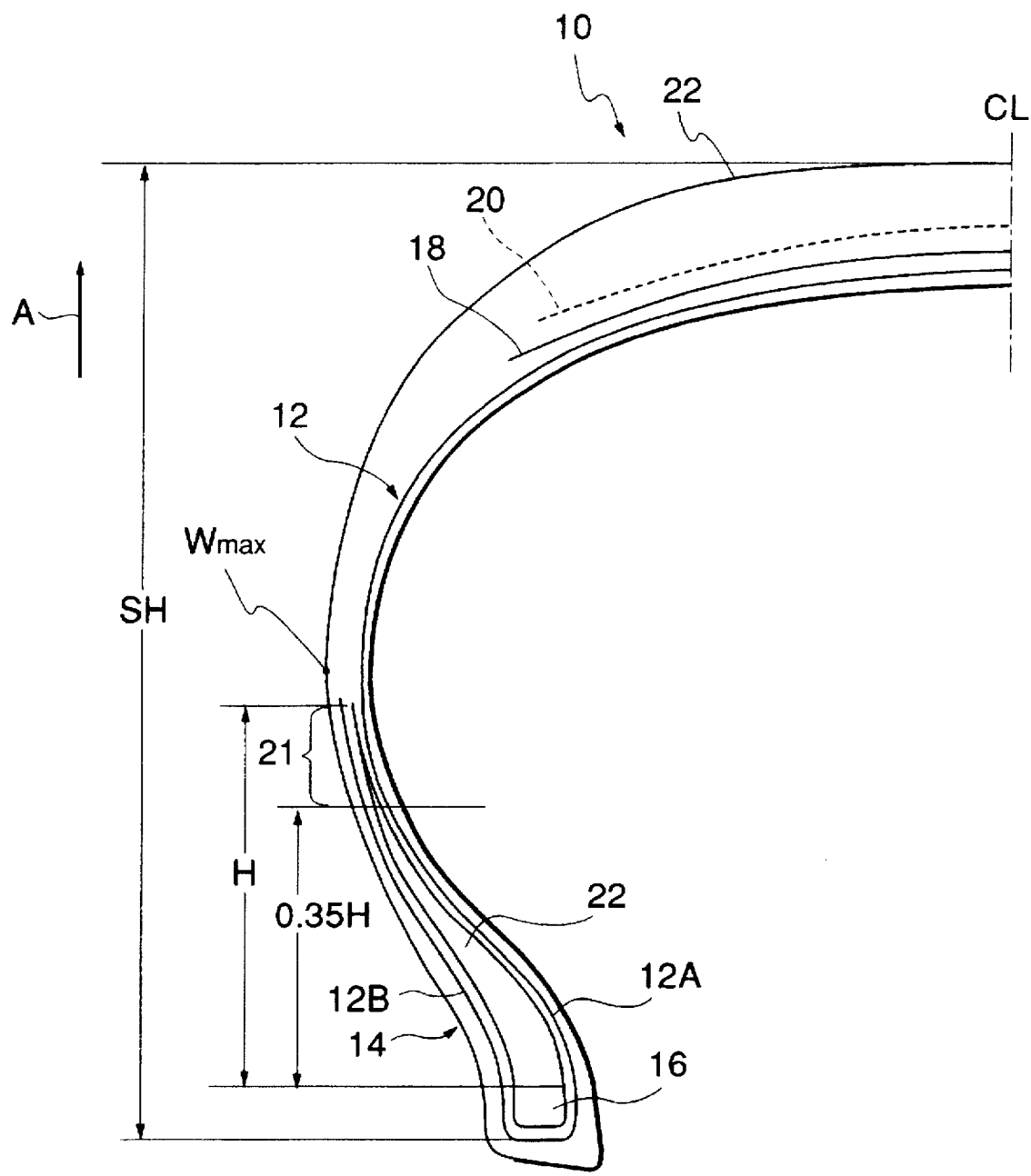
FIG. 1 is a cross-section along the axis of a pneumatic radial tire according to the invention.

As shown in FIG. 1, a pneumatic radial tire 10 (tire size: 135SR12) according to this invention has a carcass 12 comprising at least one ply having cords extending in the radial direction (at an angle of 70°–90° with respect to the circumferential direction of the tire) and both widthwise ends of the carcass 12 are turned and fixed around respective bead cores 16 in bead portions 14 from the inside to the outside thereof.

A belt layer 18 as a first rubberized ply is disposed on the radially outside (on the side directed by arrow A) of the crown portion of the carcass 12, and a belt reinforcing layer 20 as a second rubberized ply is disposed on the radially outside of the belt 18. Further, a tread 22 wherein a pattern is formed is disposed on the radially outside of the belt reinforcing layer 20.

The belt layer 18 consists of a single rubberized strip of a plurality of cords and the cords are inclined with respect to the equatorial plane CL of the tire (at an angle of 40° in this embodiment). The cord of the belt 18 in this embodiment is steel cord (structure: (1×3)×0.30) and arranged at a pitch of 32 ends/50 mm.

On the other hand, the belt reinforcing layer 20 consists of a single rubberized strip of a plurality of cords and the cords are substantially in parallel with the equatorial plane of the tire. The cord of the belt reinforcing layer in this embodiment is polyethylene terephthalate cord (1500d/2, twist structure: 14×14), and arranged at a pitch of 50 ends/50 mm. The width of the belt reinforcing layer 20 is equal to or smaller than that of the belt layer 18.

A stiffener 22 the thickness of which gradually decreases toward the maximum width portion $W_{max}$ of the tire, is disposed between a main body 12A of the carcass 12 and a turn-up portion 12B thereof.

The height H of the stiffener 22 measured in the radial direction of the tire is about 53 mm, which is about 0.53 times as high as the tire section height SH.

The thickness D of the stiffener at the bottom portion adjacent to the bead core 16 is 5 mm. The upper portion 21 of the stiffener is defined as the portion from the height of 0.35 SH (35 mm) to the top of the stiffener and the average thickness d of the upper portion 21 is 0.5–1.0 mm.

Figure 2:
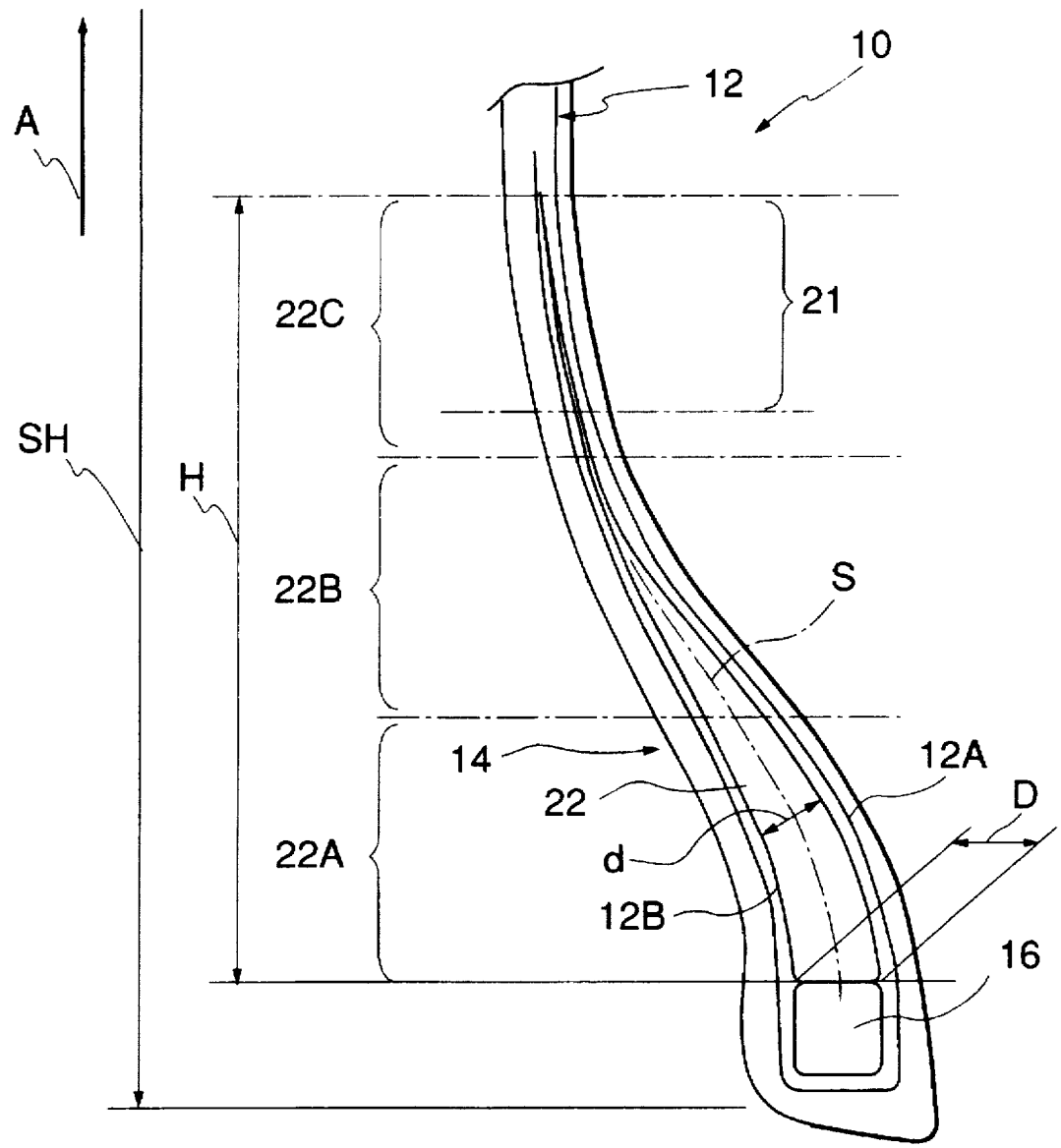
FIG. 2 is an enlarged cross-section of the bead portion of the pneumatic radial tire according to the invention shown in FIG. 1.

When the stiffener 22 is equally divided into three regions in the height direction (radial direction of the tire) as shown in FIG. 2, and a region near the bead core 16 is defined as a first region 22A, a region including the top end of the stiffener is defined as a third region 22C, and an intermediate region between the first region 22A and the third region 22C is defined as a second region 22B, and further when the thickness of the stiffener at the portion adjacent to the bead core is defined as thickness D, the average thickness d of each region is given respectively by 3.0–5.0 mm (0.6 D≦d≦D) in the first region 22A, 1.0–3.0 mm (0.2 D≦d≦0.6 D) in the second region 22B, and 0.5–1.0 mm (0.5 mm≦d≦0.2 D) in the third region 22C, and the average thickness d gradually decreases toward the top end of the stiffener. The average thickness d here is an average of each region measured along the perpendicular direction with respect to the center line S of the stiffener.

The invention will be further described with reference to the following experimental tests.

Figure 3:
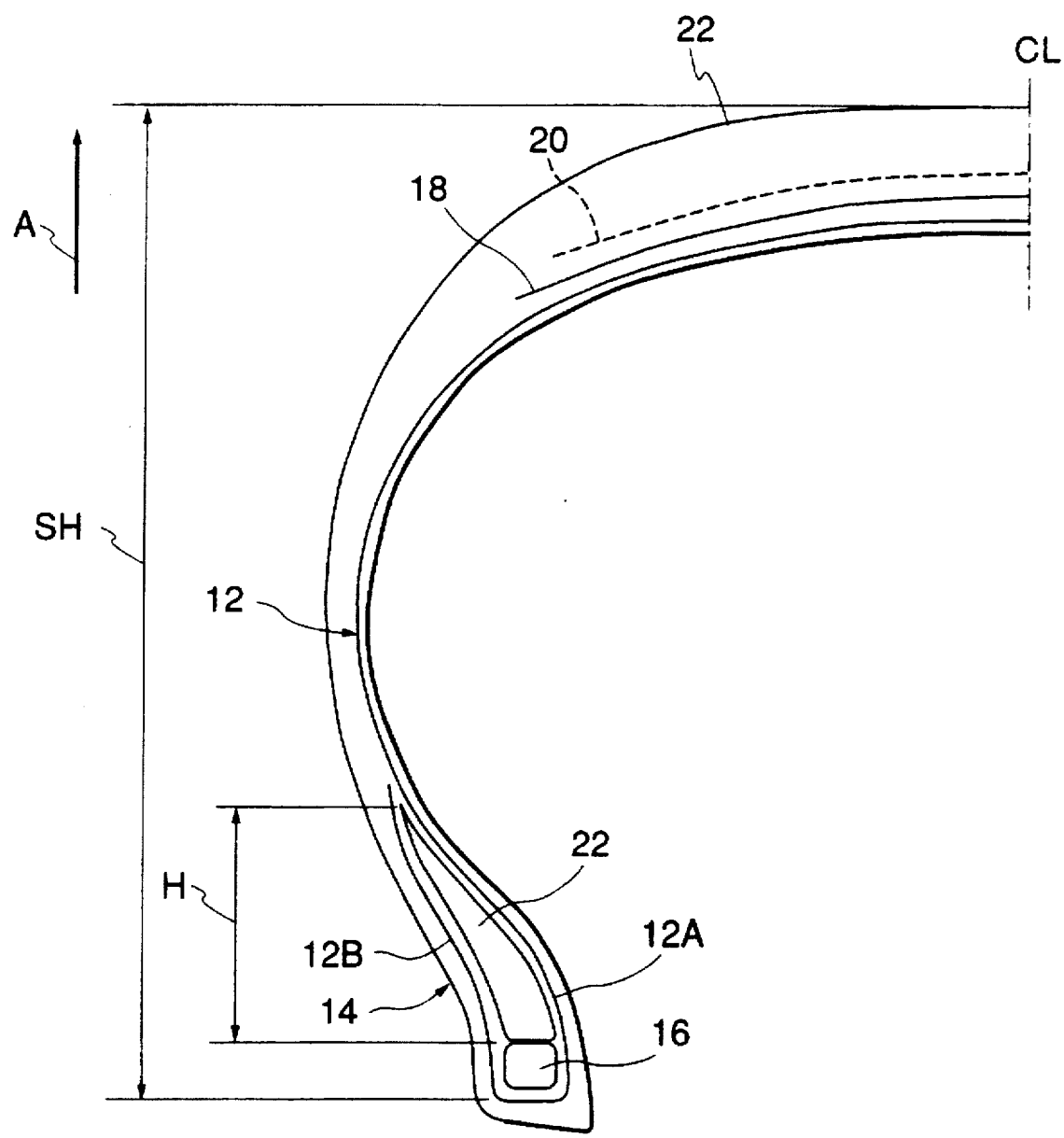
FIG. 3 is a cross-section along the axis of a pneumatic radial tire according to a comparative embodiment.

There were prepared two invention pneumatic radial tires (according to the embodiment of FIG. 1), a comparative pneumatic radial tire (see FIG. 3; wherein the same reference numerals are given to the same structural elements of the embodiment as for the pneumatic radial tire according to the invention), and a conventional pneumatic radial tire (see FIG. 4; wherein the same reference numerals are given to the same structural elements of the embodiment as for the pneumatic radial tire according to the invention).

The test tires were mounted on a front wheel drive vehicle (exhaust volume 660 cc) and a test driver evaluated steering stability by feeling while driving straight, changing lane, and driving along a curved track, at a speed of 80–120 km/h on a test course.

In the feeling test, the conventional tire (control tire), the invention tires and the comparative tire were evaluated out of a total score of 10 points.

The specifications of the respective tires and the test results obtained are shown in the following Table 1.

TABLE 1

| | | Conventional tire (Control) | Comparative tire | Invention tire 1 | Invention tire 2 |
|---|---|---|---|---|---|
| Reinforcing layer | Structure (cord angle with respect to the equatorial plane) | Two steel plies (crossing at an angle of 22°) | One steel ply (40°) One organic fiber ply (0°) | One steel ply (40°) One organic fiber ply (0°) | One steel ply (40°) One organic fiber ply (0°) |
| | Structure of the steel cord | (1 × 3) × 0.30 | (1 × 3) × 0.30 | (1 × 3) × 0.30 | (1 × 3) × 0.30 |
| | Density of the steel cord | 32 ends/50 mm | 32 ends/50 mm | 32 ends/50 mm | 32 ends/50 mm |
| | Structure of the organic fiber cord | — | Twist structure 14 × 14 | Twist structure 14 × 14 | Twist structure 14 × 14 |
| | Density of the organic fiber cord | — | 50 ends/50 mm | 50 ends/50 mm | 50 ends/50 mm |

TABLE 1-continued

|  |  | Conventional tire (Control) | Comparative tire | Invention tire 1 | Invention tire 2 |
|---|---|---|---|---|---|
| Stiffener | Hardness | 96° | 96° | 96° | 96° |
|  | Height H | 0.33 SH (≈ 33 mm) | 0.33 SH (≈ 33 mm) | 0.53 SH (≈ 53 mm) | 0.45 SH (≈ 45 mm) |
|  | Thickness d of the upper portion | — | — | 0.75 mm | 0.58 mm |
|  | Thickness of each region |  |  |  |  |
|  | d (First region) | 4.0 mm | 4.0 mm | 4.0 mm | 4.0 mm |
|  | d (Second region) | 2.5 mm | 2.5 mm | 2.0 m | 2.0 mm |
|  | d (Third region) | 1.25 mm | 1.25 mm | 0.75 mm | 0.75 mm |
|  | Sectional area (Index) | 100 | 100 | 100 | 90 |
| Weight of the tire |  | 4.1 kg | 3.8 kg | 3.8 kg | 3.7 kg |
| Steering stability |  | 7 | 4 | 8 | 8 |

As shown by the test results, the conventional tire has a sufficient steering stability but has a heavy weight, and the comparative tire has light weight but has degraded steering stability; on the contrary, the invention tires have light weight and enhanced steering stability.

In addition, when a modulus ratio $\eta = M_T/M_R$ of the stiffener 22 which is defined as modulus $M_T$ along the circumferential direction to modulus $M_R$ along the radial direction is made larger adjacent the maximum width portion $W_{max}$ of the tire than adjacent the bead core 16, the torsion rigidity in the rolling direction can be enhanced.

When the modulus ratio $\eta$ is designed so as to be gradually larger toward the top of the stiffener adjacent the maximum width point $W_{max}$ from adjacent the bead core 16, it is possible to enhance the torsion rigidity which influences the steering stability and to lower the radial rigidity of the tire which influences riding comfort.

Further, when the modulus ratio at the bottom of the first region 22A is defined as $\eta_0$, the modulus ratio at a boundary portion of the first region 22A and the second region 22B is defined as $\eta_1$, the modulus ratio at the boundary portion of the second region 22B and the third region 22C is defined as $\eta_2$, and the modulus ratio at the top portion adjacent the maximum width point $W_{max}$ is defined as $\eta_3$, it is preferable that the modulus ratio $\eta$ is given as $\eta_0 \leq \eta \leq \eta_1$ in the first region 22A, $\eta_1 < \eta \leq \eta_2$ in the second region 22B, and $\eta_2 < \eta \leq \eta_3$ in the third region 22C, and further in each region the modulus ratio $\eta$ is made larger toward the top of the stiffener.

However it is preferable that the relation between the modulus ratio $\eta_0$, the modulus ratio $\eta_1$, the modulus ratio $\eta_2$, and the modulus ratio $\eta_3$, is given as $1 \leq \eta_1/\eta_0 \leq 1.10$, $1.10 < \eta_2/\eta_0 \leq 1.25$, and $1.25 < \eta_3/\eta_0 \leq 1.50$.

In the above mentioned embodiment, the belt reinforcing layer 20 comprises polyethylene terephthalate as organic fiber cords; however, other substantially inextensible cords such as aromatic polyamide fiber cord may be used.

In the above mentioned embodiment, a single belt reinforcing layer 20 is used; however, it is possible to use two or more belt reinforcing layers.

The pneumatic radial tire according to this invention has advantages of reduced weight while retaining the steering stability.

While the invention has been particularly shown and described with reference to certain preferred embodiments thereof, it will be understood by those skilled in the art that various changes and modifications may be made with departing from the spirit and scope of the invention.

I claim:

1. A pneumatic radial tire comprising; a pair of bead cores, a carcass extending toroidally between the bead cores, a stiffener disposed one on each bead core, and a belt comprising rubberized cord plies and disposed on a crown portion of the carcass, wherein the rubberized cord plies comprise a first rubberized ply having steel cords inclined with respect to the tire equatorial plane and at least one second rubberized ply having organic fiber cords extending substantially in parallel with the tire equatorial plane, wherein the relation between the height H of the stiffener in the radial direction and the section height SH of the tire is given by $0.4 \text{ SH} \leq H \leq 0.6 \text{ SH}$, and the average thickness d of the upper portion of the stiffener defined between a height corresponding to 0.35 SH and the top of the stiffener is given by $0.5 \text{ mm} \leq d \leq 0.2 \text{ D}$ where D is the thickness of the stiffener at the bottom portion adjacent to the bead core, and wherein the stiffener is equally divided into a first region, a second region and a third region in turn in the radially outward direction and the relation between the average thickness d of each region of the stiffener and the thickness D is given by $0.6 \text{ D} \leq d \leq D$ in the first region, $0.2 \text{ D} \leq d \leq 0.6 \text{ D}$ in the second region, and $0.5 \text{ mm} \leq d \leq 0.2 \text{ D}$ in the third region.

2. The pneumatic radial tire of claim 1 wherein said at least one second rubberized ply is a single rubberized ply of polyethylene terephthalate cords.

3. The pneumatic radial tire of claim 1 wherein said at least one second rubberized ply is a single rubberized ply of aromatic polyamide fiber cords.

4. The pneumatic radial tire of claim 1 wherein the width of said at least one second rubberized ply is not greater than the width of said first rubberized ply.

5. The pneumatic radial tire of claim 1 wherein said average thickness d in said third region gradually reduces toward the top end of said stiffener.

6. The pneumatic radial tire of claim 1 wherein a modulus ratio of said stiffener is $\eta = M_T/M_R$ where $M_T$ is a modulus along the circumferential direction and $M_R$ is a modulus along the radial direction and $\eta$ is larger at a point adjacent a maximum tire width position than at a point adjacent said bead core.

7. The pneumatic radial tire of claim 6 wherein a modulus ratio at the bottom of said first region is $\eta_0$ and modulus ratios at boundary portions between said first region and said second region and between said second region and said third region are given as $\eta_1$ and $\eta_2$ and wherein $\eta_o \leq \eta \leq \eta_1$ in said first region.

8. The pneumatic radial tire of claim 7 wherein $\eta_1 \leq \eta \leq \eta_2$ in said second region.

9. The pneumatic radial tire of claim 7 wherein $\eta_3$ is the modulus at said tire maximum width position and wherein $\eta_2 < \eta \leq \eta_3$ in said third region.

10. The pneumatic radial tire of claim 7 wherein $\eta_3$ is the modulus at said tire maximum width position and wherein $1 < \eta_1/\eta_o \leq 1.10$ and $1.10 < \eta_2/\eta_o \leq 1.25$ and $1.25 \leq \eta_3/\eta_o \leq 1.50$.

11. The pneumatic radial tire of claim 7 wherein in each region the modulus ration $\eta$ gradually increases toward the top of the stiffener.

* * * * *